United States Patent
Shao et al.

(10) Patent No.: US 8,891,451 B2
(45) Date of Patent: Nov. 18, 2014

(54) METHOD AND SYSTEM FOR WIRELESS COMMUNICATION CHANNEL ALLOCATION IN WIRELESS NETWORKS

(71) Applicant: Samsung Electronics Co., Ltd., Gyeonggi-do (KR)

(72) Inventors: Huai-Rong Shao, San Jose, CA (US); Chiu Ngo, San Francisco, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 99 days.

(21) Appl. No.: 13/663,420

(22) Filed: Oct. 29, 2012

(65) Prior Publication Data
US 2013/0107829 A1    May 2, 2013

Related U.S. Application Data

(60) Provisional application No. 61/553,581, filed on Oct. 31, 2011.

(51) Int. Cl.
*H04W 4/00*    (2009.01)

(52) U.S. Cl.
USPC .......................... 370/328; 370/329; 370/334

(58) Field of Classification Search
USPC .................. 370/328, 329, 334, 338
See application file for complete search history.

(56) References Cited

U.S. PATENT DOCUMENTS

| | | | |
|---|---|---|---|
| 2004/0203829 A1* | 10/2004 | Miyoshi et al. | 455/452.1 |
| 2004/0209634 A1* | 10/2004 | Hrastar | 455/515 |
| 2007/0060158 A1 | 3/2007 | Medepalli et al. | |
| 2007/0105552 A1* | 5/2007 | Hun et al. | 455/434 |
| 2008/0043813 A1* | 2/2008 | Azenkot et al. | 375/133 |
| 2009/0040108 A1* | 2/2009 | Katz | 342/386 |
| 2009/0207798 A1* | 8/2009 | Shan et al. | 370/329 |
| 2010/0165861 A1* | 7/2010 | Rrdland et al. | 370/252 |
| 2010/0197317 A1 | 8/2010 | Sadek et al. | |
| 2011/0183685 A1* | 7/2011 | Burton et al. | 455/456.1 |
| 2012/0147000 A1* | 6/2012 | Song et al. | 345/419 |
| 2012/0243494 A1* | 9/2012 | Trachewsky | 370/329 |
| 2012/0270537 A1* | 10/2012 | Weng et al. | 455/424 |

FOREIGN PATENT DOCUMENTS

KR    10-2000-0056462 A    9/2000

OTHER PUBLICATIONS

De Vegt, R., "Motions and Strawpoll on Channelization for 11ah", IEEE 802.11-11/1329r1, Sep. 2011, Slides 1-9, IEEE, USA.
Nasipuri, A. et al., "Multi-channel MAC with Dynamic Channel Selection for Ad Hoc Networks", Technical Report, Jan. 2004, pp. 1-9, Department of Electrical & Computer Engineering, The University of North Carolina at Charlotte, United Sates.
International Search Report and Written Opinion dated Feb. 28, 2013 for International Application No. PCT/KR2012/009050 from Korean Intellectual Property Office, pp. 1-6, Seo-gu, Daejeon, Republic of Korea.

* cited by examiner

*Primary Examiner* — Andrew Lee
(74) *Attorney, Agent, or Firm* — Kenneth L. Sherman, Esq.; Michael Zarrabian, Esq.; Sherman & Zarrabian LLP

(57) ABSTRACT

Wireless communication channel allocation comprises scanning wireless channels for available wireless channels, wherein each wireless channel has an associated bandwidth, and selecting a channel among the available wireless channels for allocation in wireless communication. Selecting a channel comprises selecting a channel among the available wireless channels such that a maximum number of channels with wider bandwidth than the selected channel remain available after the selection.

32 Claims, 16 Drawing Sheets

METHOD AND SYSTEM FOR WIRELESS COMMUNICATION CHANNEL ALLOCATION IN WIRELESS NETWORKS

CROSS-REFERENCE TO RELATED APPLICATIONS

This application claims the priority benefit under 35 U.S.C. §119(e) of U.S. Provisional Patent Application Ser. No. 61/553,581, filed on Oct. 31, 2011, incorporated herein by reference.

FIELD OF THE INVENTION

The present invention relates generally to wireless networks and more particularly to wireless communication channel allocation.

DESCRIPTION OF RELATED ART

A typical wireless network includes a wireless access point (AP) and one or more wireless stations. When a new network or a new peer-to-peer connection is established, a conventional wireless channel selection approach involves wireless channel scanning. If multiple wireless channels are determined available as a result of the channel scanning, then one available wireless channel is randomly selected for wireless communication. This approach is applicable for wireless communication wherein all available wireless channels have the same channel bandwidth.

BRIEF SUMMARY OF THE INVENTION

The present invention relates to wireless communication channel allocation for wireless communication. In one embodiment, wireless communication channel allocation comprises scanning wireless channels for available wireless channels, wherein each wireless channel has an associated bandwidth, and selecting a channel among the available wireless channels for allocation in wireless communication. Selecting a channel comprises selecting a channel among the available wireless channels such that a maximum number of channels with wider bandwidth than the selected channel remain available after the selection.

In one embodiment, selecting a channel comprises selecting a channel among the available wireless channels such that the selected channel has least overlap with other available wider bandwidth channels.

In one embodiment, channel allocation further comprises associating a weight value to each channel and selecting a channel based on the weight associated with the available channel. Associating a weight value to each channel comprises associating an initial weight value to each available channel based on the number of different channel bandwidths as channel types. The channels are scanned based on channel weights for available channels to reduce channel selection duration. A channel is selected among the available channels such that the selected channel has least overlap with other wider bandwidth available channels.

In one embodiment, scanning channels for available channels is based on the weights associated with the channels from low to high, to reduce channel selection duration. In one embodiment, a channel with the lowest weight value is selected from all available channels based on scanning results. The weight of the selected channel is adjusted to an upper limit value, and the weight of an overlapping channel of the same bandwidth as the selected channel is reduced. Further, the weight of an overlapping channel of a different bandwidth than the selected channel is adjusted to said upper limit value.

In one embodiment, selecting a channel is based on the weight associated with the channel, such that a maximum number of channels with wider bandwidth than the selected channel remain available after the selection.

One embodiment further comprises categorizing a lower half of a channel bandwidth as a primary channel, upper half of the channel bandwidth as a secondary channel, wherein the primary channel has a higher priority for selection, and selecting a secondary channel only when no primary channels are available.

One embodiment further comprises selecting a lower half or an upper half of a channel bandwidth based on availability, wherein said lower half has the same priority for selection as said upper half. One embodiment further comprises re-allocating a currently selected channel to a new available channel bandwidth location having the lowest weight.

These and other features, aspects, and advantages of the present invention will become understood with reference to the following description, appended claims, and accompanying figures.

DETAILED DESCRIPTION

The present invention relates to wireless communication channel allocation for wireless communication. In one embodiment, the present invention provides channelization and wireless channel allocation for wireless networks that allow wireless channels to have different amounts of bandwidth. In one embodiment of the invention, a weight-based channel selection scheme is provided to optimize channel allocation efficiency.

Embodiments of the invention provide increased channelization efficiency and optimized channel selection to allow a higher probability for wider bandwidth channel selection (allocation). Wireless communication comprises scanning wireless channels for available wireless channels, wherein each wireless channel has an associated bandwidth, and selecting a channel among the available wireless channels for allocation wireless communication. Selecting a channel comprises selecting a channel among the available wireless channels such that a maximum number of available wider bandwidth channels remain after the selection. An available channel (i.e., idle channel or clean channel) means a channel with low noise.

Figure 1:
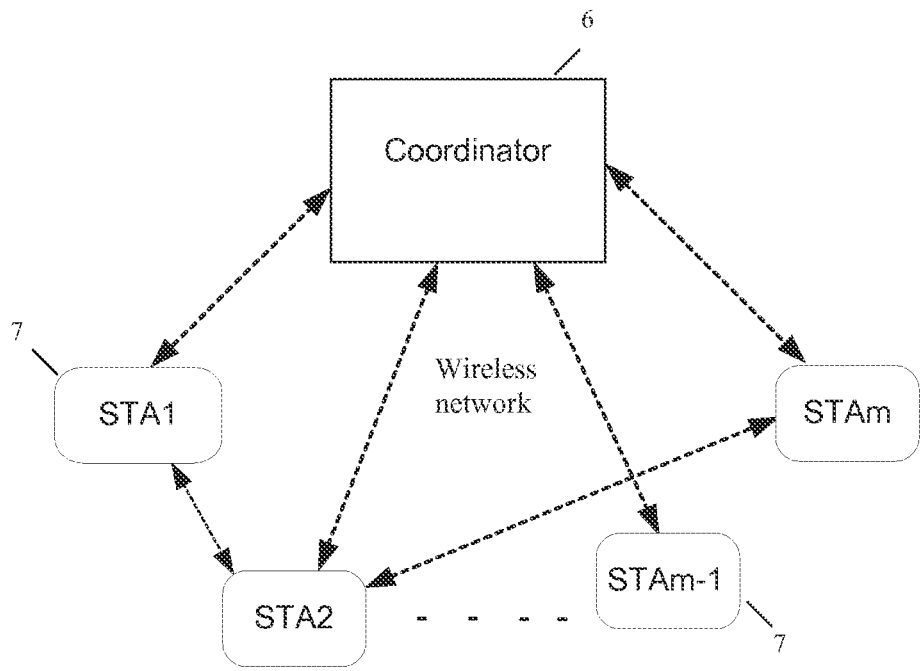
FIG. 1 shows a block diagram of a wireless communication system implementing wireless channel allocation and channelization, according to an embodiment of the present invention.

FIG. 1 shows an embodiment of a wireless communication network 5, according to the present invention, including multiple (m) electronic wireless devices, such as wireless communication stations 7 comprising wireless transmitter and/or receiver devices, and a wireless coordinator station 6, such as an access point (AP), implementing a channel allocation protocol for data communication over a wireless communication medium (e.g., radio frequency channels).

In one example, wireless communication is implemented via a Media Access Control (MAC) layer and a physical (PHY) layer in each wireless station. For example, in a transmitting wireless station, a MAC layer receives a MAC Service Data Unit (MSDU) and attaches a MAC header thereto in order to construct a MAC Protocol Data Unit (MPDU). The MAC header includes information such as a source address (SA) and a destination address (DA). The MPDU is a part of a PHY Service Data Unit (PSDU) and is transferred to a PHY layer in the transmitting wireless station to attach a PHY header (i.e., PHY preamble) thereto to construct a PHY Protocol Data Unit (PPDU). The PHY header includes parameters for determining a transmission scheme including a coding/modulation scheme. Before transmitting a packet from the wireless transmitter to a receiving wireless station over a wireless channel, a preamble is attached to the PPDU, wherein the preamble can include channel estimation and synchronization information.

Figure 2:
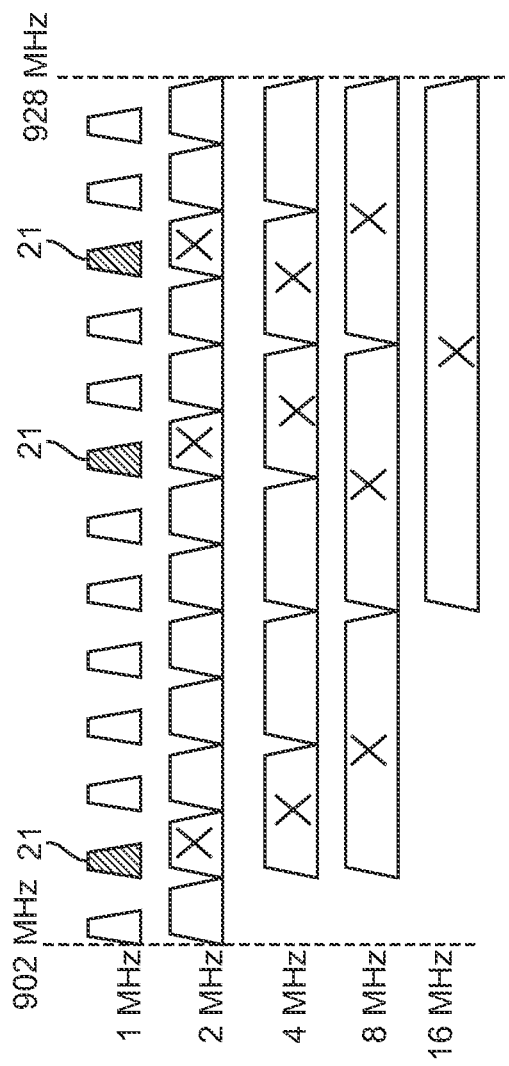
FIG. 2 shows an example of a typical channelization for a 2 MHz channel, wherein only a lower half frequency of each 2 MHz channel is used for a 1 MHz channel according to IEEE 802.11 standards.

In a typical wireless channel allocation process for wireless communication, as shown in FIG. 2 for a 2 MHz channel, only a lower half frequency of each 2 MHz channel is used for a 1 MHz channel. If multiple wireless channels are determined clear and available as a result of the channel scanning, then one available wireless channel is randomly selected for wireless communication. As shown by example in FIG. 2, three 1 MHz channels 21 are already used and the remaining channels are un-used. An AP or a wireless station cannot find any 8 MHz channels or 16 MHz channels available, although overall there is still 23 MHz channel bandwidth available. If multiple wireless channels are determined clear and available as a result of the channel scanning, then one available wireless channel is randomly selected for wireless communication.

Figure 3:
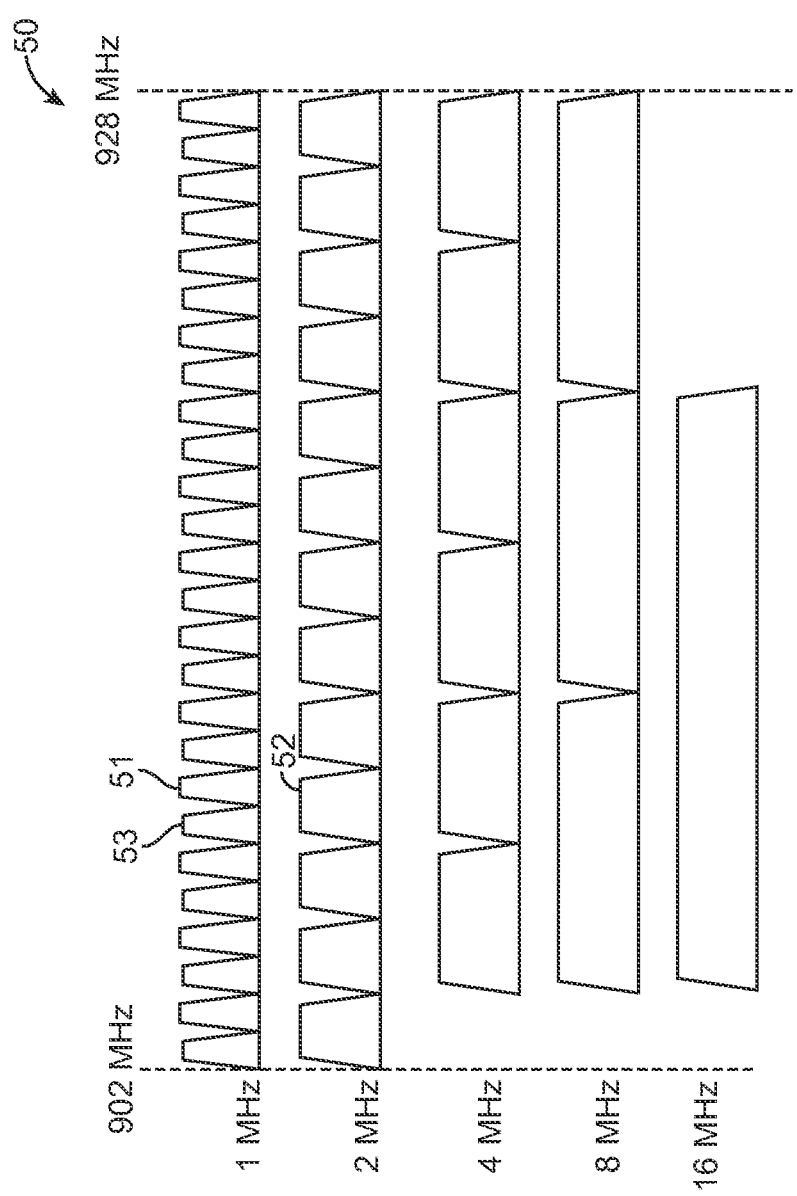
FIG. 3 shows a channelization when twenty-six 1 MHz channels can be used with same priority, according to an embodiment of the present invention.

FIG. 3 shows an example channelization process 30, according to an embodiment of the invention. For example, each 2 MHz channel 52 has a lower half 1 MHz channel 53 and an upper half 1 MHz channel 51, providing twenty-six 1 MHz channels that can be used with the same priority for selection. The channelization in FIG. 3 is an alternative approach to that shown in FIG. 2, wherein in FIG. 3 both the lower 1 MHz half and the upper 1 MHz half of a 2 MHz channel can be used for selection and allocation.

According to an embodiment of the invention, a channelization process allows utilizing 1 MHz channels for IEEE 802.11 standards, wherein 1 MHz channels are categorized as 2 classes: Primary 1 MHz channels, which are the lower half frequency of each 2 MHz channel, and Secondary 1 MHz channels, which are the higher half frequency of each 2 MHz bandwidth channel. The secondary 1 MHz channels can be optionally used only if no primary channels are available.

Figure 4:
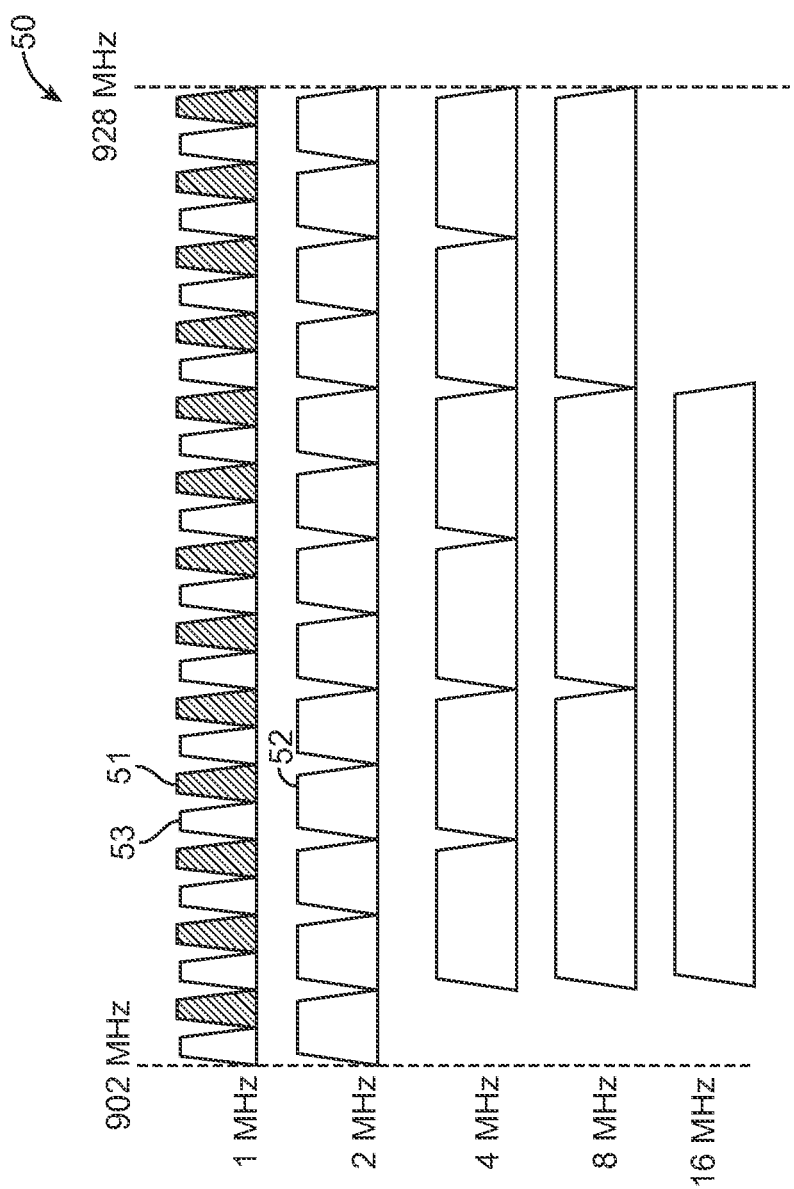
FIG. 4 illustrates a weight-based channelization approach useful for IEEE 802.11 standards, according to an embodiment of the invention.

FIG. 4 illustrates a channelization approach 50 useful for IEEE 802.11 standards, according to an embodiment of the invention. For a given channel, both lower and upper halves of the channel can be used, but with a different priority for selection of each half. For example, each 2 MHz channel 52 has a lower half 1 MHz channel 53 and an upper half 1 MHz channel 51. The upper (higher) half frequency of each 2 MHz channel can be added as a new 1 MHz channel 51 for selection, providing a total of twenty-six 1 MHz channels between 902 MHz and 928 MHz. The newly added 1 MHz channels 51 at the higher frequency half of each 2 MHz channel 52 may be used only if none of the original 1 MHz channels 53 are available. Specifically, the twenty-six 1 MHz channels are categorized as 2 classes: Primary 1 MHz channels 53, which are the lower half frequency of each 2 MHz channel, and Secondary 1 MHz channels 51, which are the higher half frequency of each 2 MHz channel. The secondary 1 MHz channels 51 can be optionally used only if no primary channel 53 is available. As such, in contrast to the approach in FIG. 3 in the approach illustrated in FIG. 4, the primary channels 53 have higher priority in selection compared to the secondary channels 51.

According to an embodiment of the invention, a weight-based channel selection scheme enables selection of wider bandwidth channels for allocation in wireless communication, compared to conventional random channel selection schemes. A weight for a channel can be dynamically adjusted based on the status of related channels. For determining channels available for selection, channels are scanned based on their weights from low to high, instead of scanning all possible channels. This reduces channel selection time. Further, channel re-allocation or switching is provided. If a channel can be re-located to multiple locations, the channel location with lowest weight is first considered.

In one embodiment of the invention, for establishing a new network such as BSS (basic service set) among all available wireless communication channels, an idle channel is selected (allocated) to reduce the number of idle (available) wider bandwidth channels. The selected channel has least overlap with other wider bandwidth channels.

In a wireless station including a PHY layer and a MAC layer as defined in IEEE 802.11 standards, channel availability is determined via channel scanning. A PHY design such as Mask may affect channel availability, for example, interference between adjacent channels.

Figure 5:
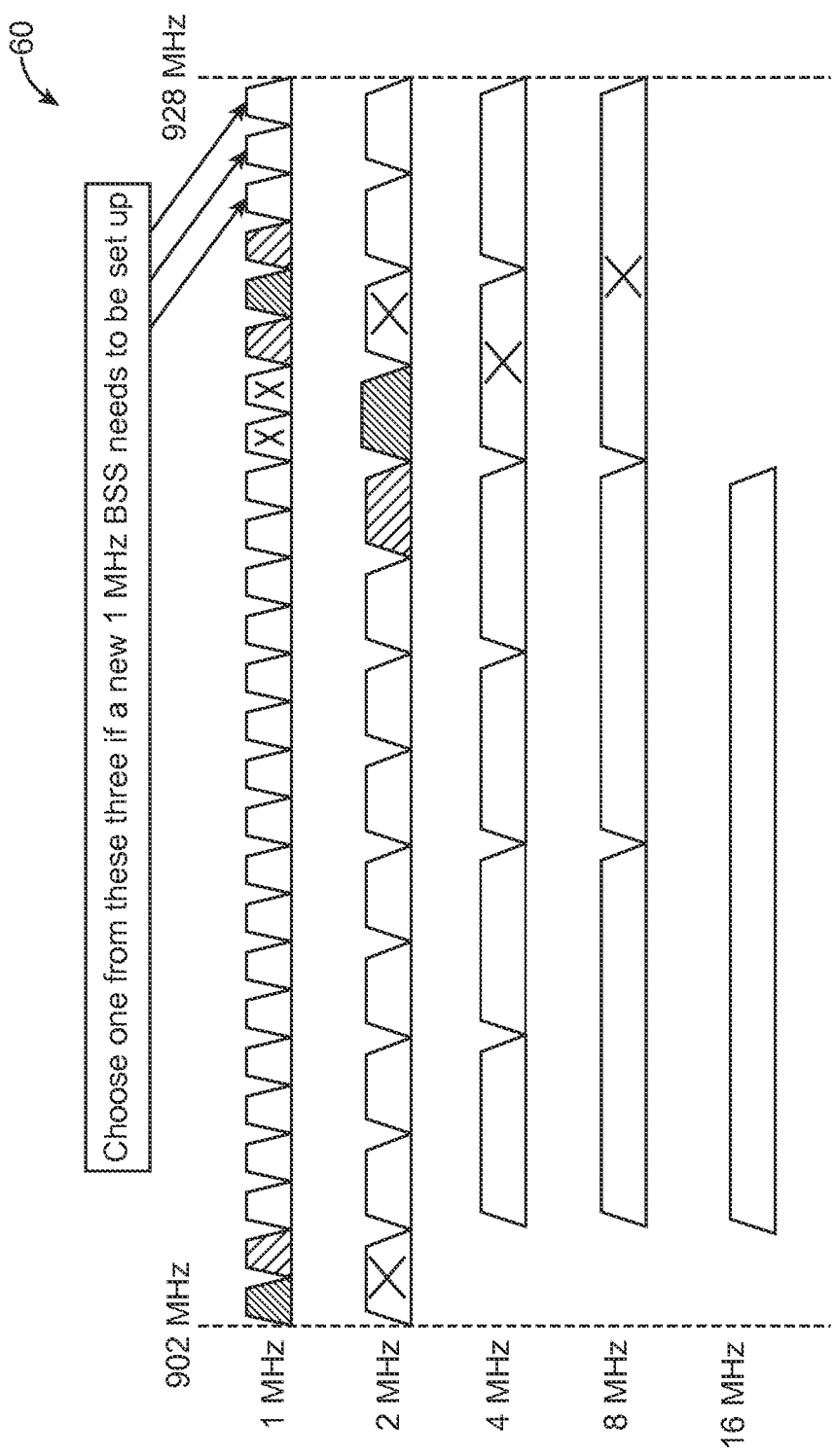
FIG. 5 shows an example channelization wherein neighboring channels have interference with each other.
Figure 6:
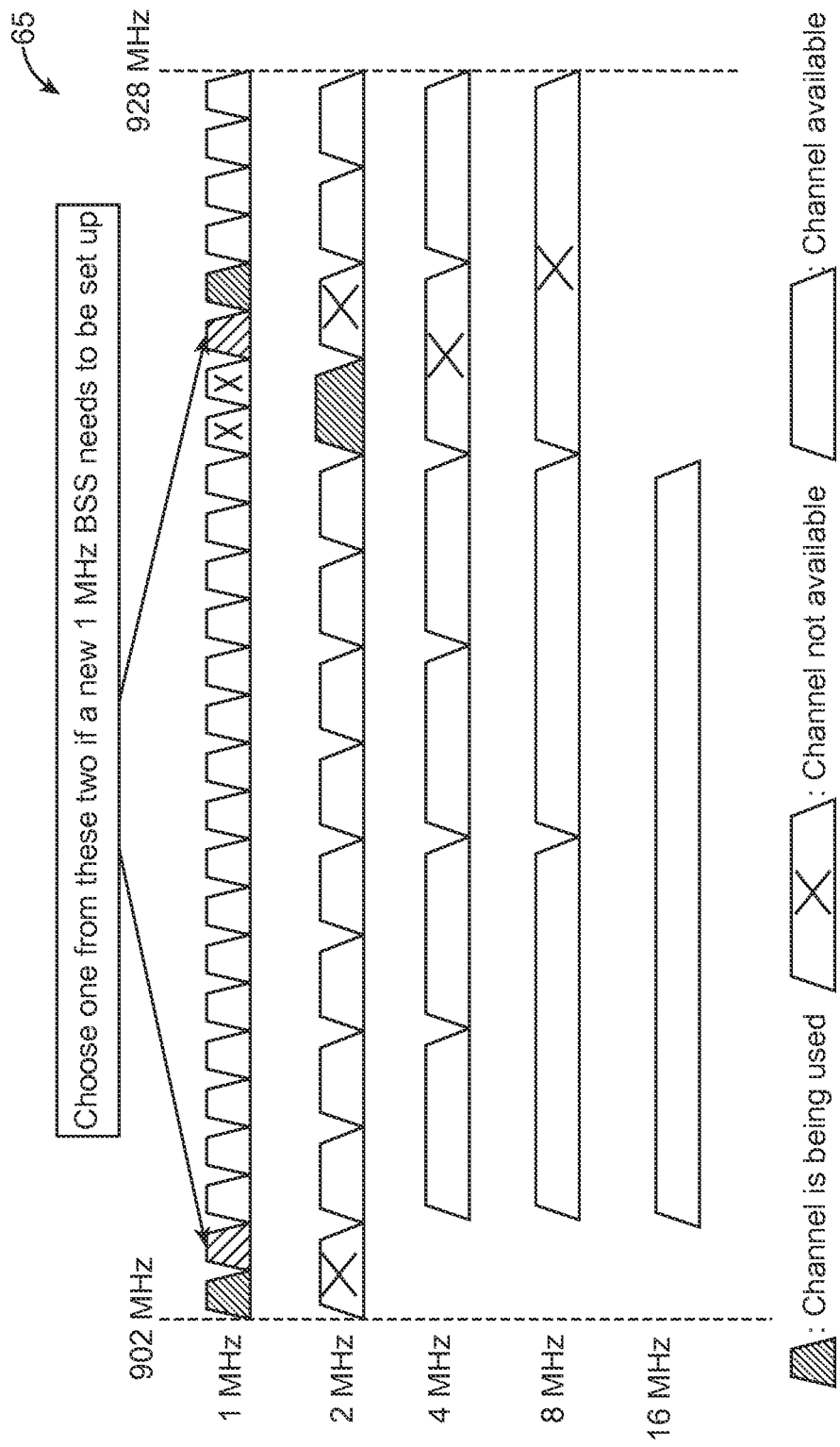
FIG. 6 illustrates an example channelization wherein neighboring channels do not interfere with each other.

FIG. 5 shows an example channelization approach 60 for a case when the PHY design such as Mask design causes interference between neighboring channels, such that adjacent channels are not treated as available based on channel scanning results. FIG. 6 illustrates an example channelization approach 65 wherein adjacent channels can be treated as available based on channel scanning results, because interference between adjacent channels is low. Specifically, FIG. 6 illustrates a case wherein neighboring channels do not interfere with each other due to PHY design.

Figure 7:
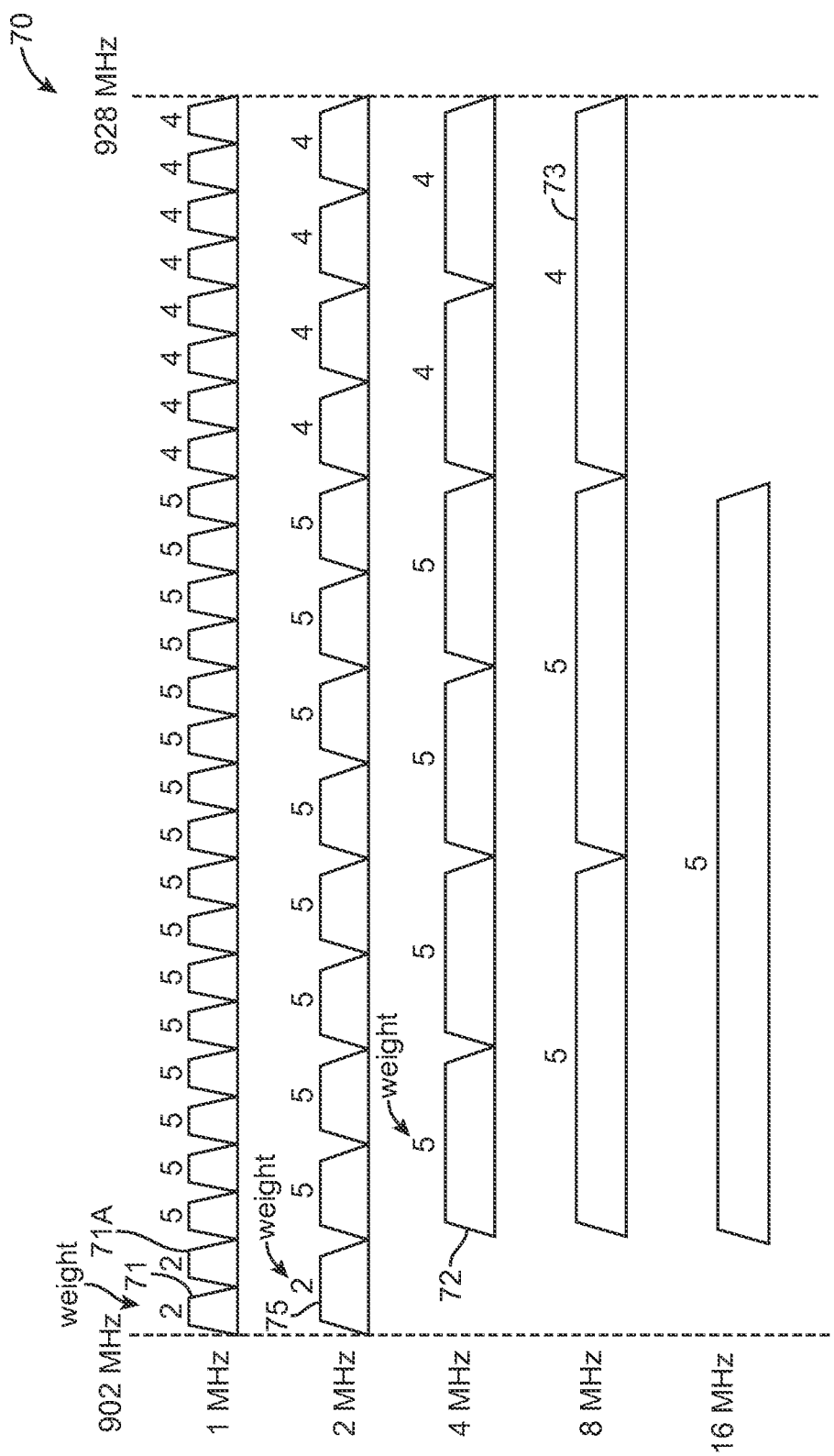
FIG. 7 shows an example channelization with initial weight value for all channels, according to an embodiment of the present invention.

According to embodiments of the invention, a weight-based channel allocation process (channelization) is utilized. FIG. 7 shows an example channelization with initial weight value for all channels. Different channel types represent channels with different bandwidths. In this example, there are five channel types: 1 MHz, 2 MHz, 4 MHz, 8 MHz and 16 MHz. As shown by process 70 in FIG. 7, initially, when all the wireless communication channels are available, a base initial weight value for each channel is set to the number of channels types (e.g., 5), which can use the frequency band of that channel, entirely or partially. In one example, the base weight value of a 1 MHz channel 71 at the frequency band 902-903 MHz is set to 2 because only a 1 MHz channel and 2 MHz channel can use this frequency band. The base weight value of a 4 MHz channel 72 at the frequency 904-908 MHz is set to 5 because all channel types can use this frequency band. The base weight value of a 8 MHz channel 73 at the frequency band 920-928 MHz is set to 4 since 1 MHz, 2 MHz, 4 MHz and 8 MHz channels can use this frequency band.

In order to set up a new network or peer-to-peer connection, an AP or wireless station selects a channel with the lowest weight value from all available channels based on scanning results. If a channel is being used or the scanning result shows the channel is not clear, the weight of that channel is set to an upper limit value (e.g., 100) to prevent scanning of that channel. In addition, the weight values of other types of channels which are overlapping that channel are also set to that upper limit value to prevent selection of such channels.

Figure 8:
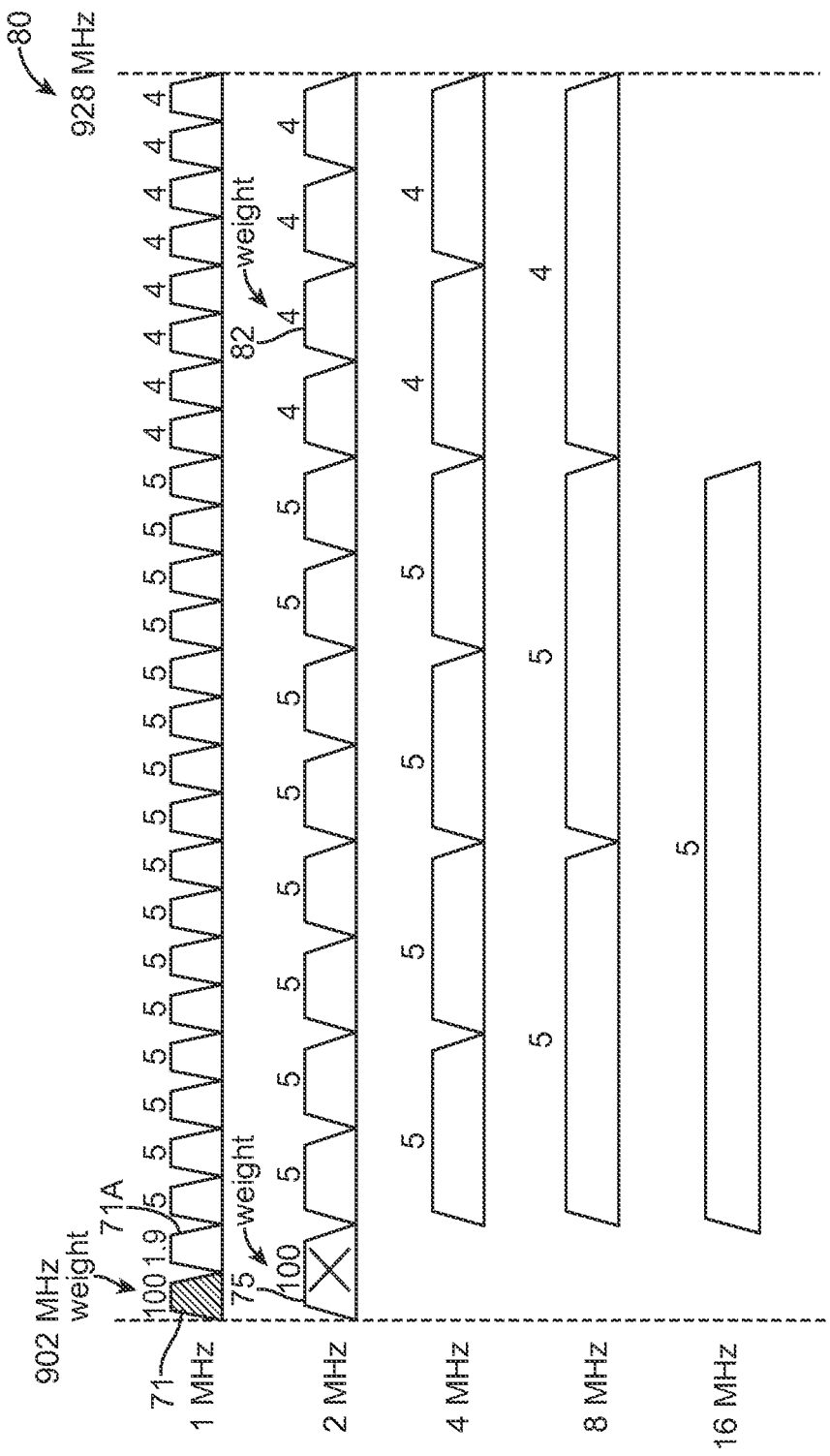
FIG. 8 shows a weight-based channelization and channel weight updating process based on FIG. 7 after one 1 MHz channel is selected, according to an embodiment of the present invention.

According to an embodiment of the invention, when a 1 MHz channel 71 is already in use (unavailable), the weight values of the other channels 71A and 75 in FIG. 7 are updated according to processes 80 in FIG. 8. When a current channel (e.g., 1 MHz channel 71 in FIG. 7) is in use, weight value of the channel is set to the upper limit 100. Further, the weight value of an overlapping channel 75 (i.e., the 2 MHz channel 75 which is of different type than the 1 MHz channel 71), is set to the upper limit 100. Further, relative to a current channel (e.g., 1 MHz channel 71 in FIG. 7) The weight values of other channels (e.g., 1 MHz channel 71A), which are within the same channel of a wider bandwidth channel (e.g., 2 MHz channel 75) overlapping with the current channel are reduced slightly. For example, the weight of channel 71A is reduced from 2.0 in FIGS. 7 to 1.9 in FIG. 8. The reduction value is determined based on the number of the overlapping wider bandwidth channels, multiplied by a small value (e.g., 0.1). The multiplier is based on the number of overlapping channels. In one example, the small value must be smaller than a basic unit value (i.e., 1), divided by total channel types (i.e., 5), and the small value must be larger than 0.

Figure 9:
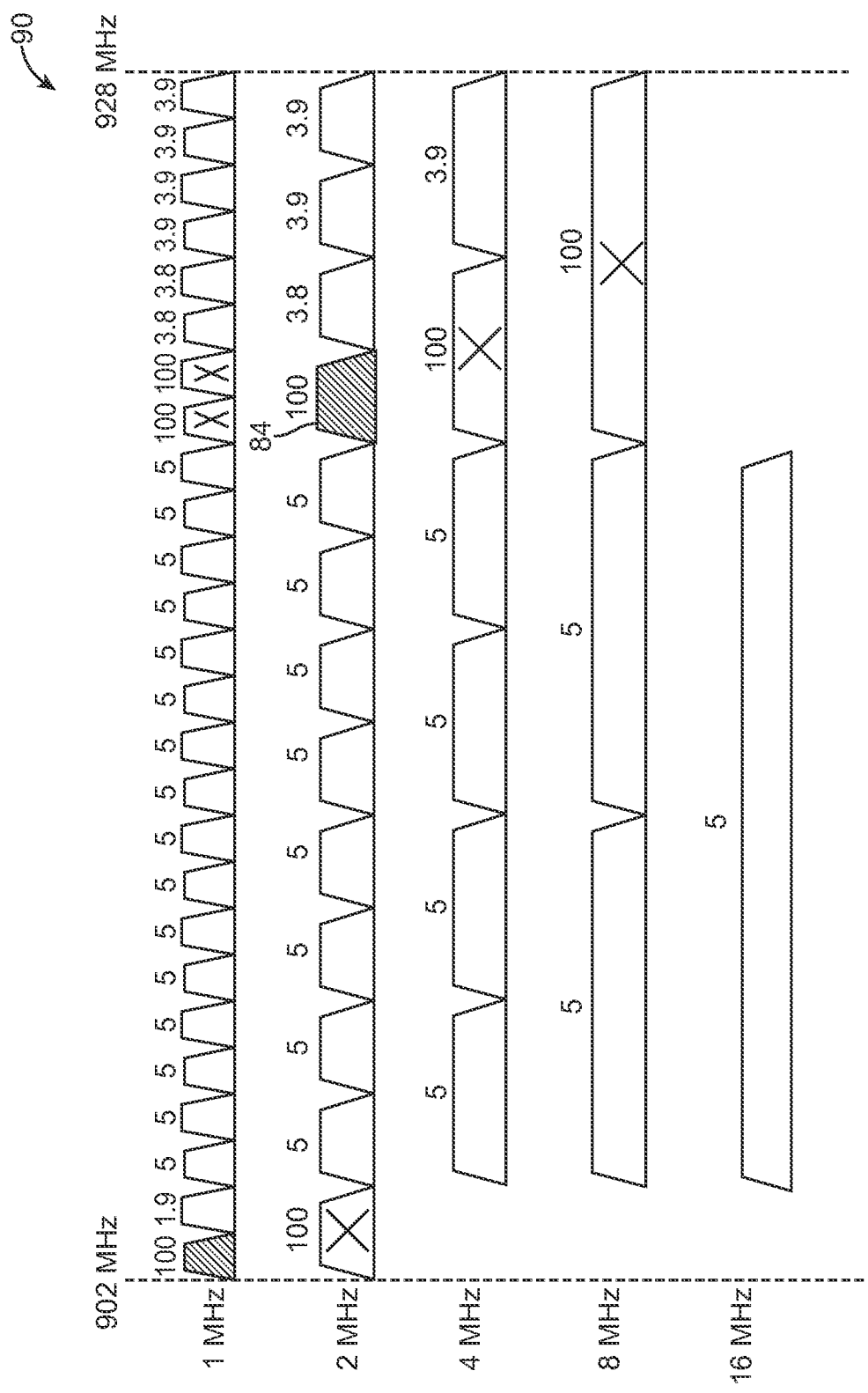
FIG. 9 shows a weight-based channelization and channel weight updating process based on FIG. 8 after one 2 MHz channel is selected, according to an embodiment of the present invention.
Figure 10:
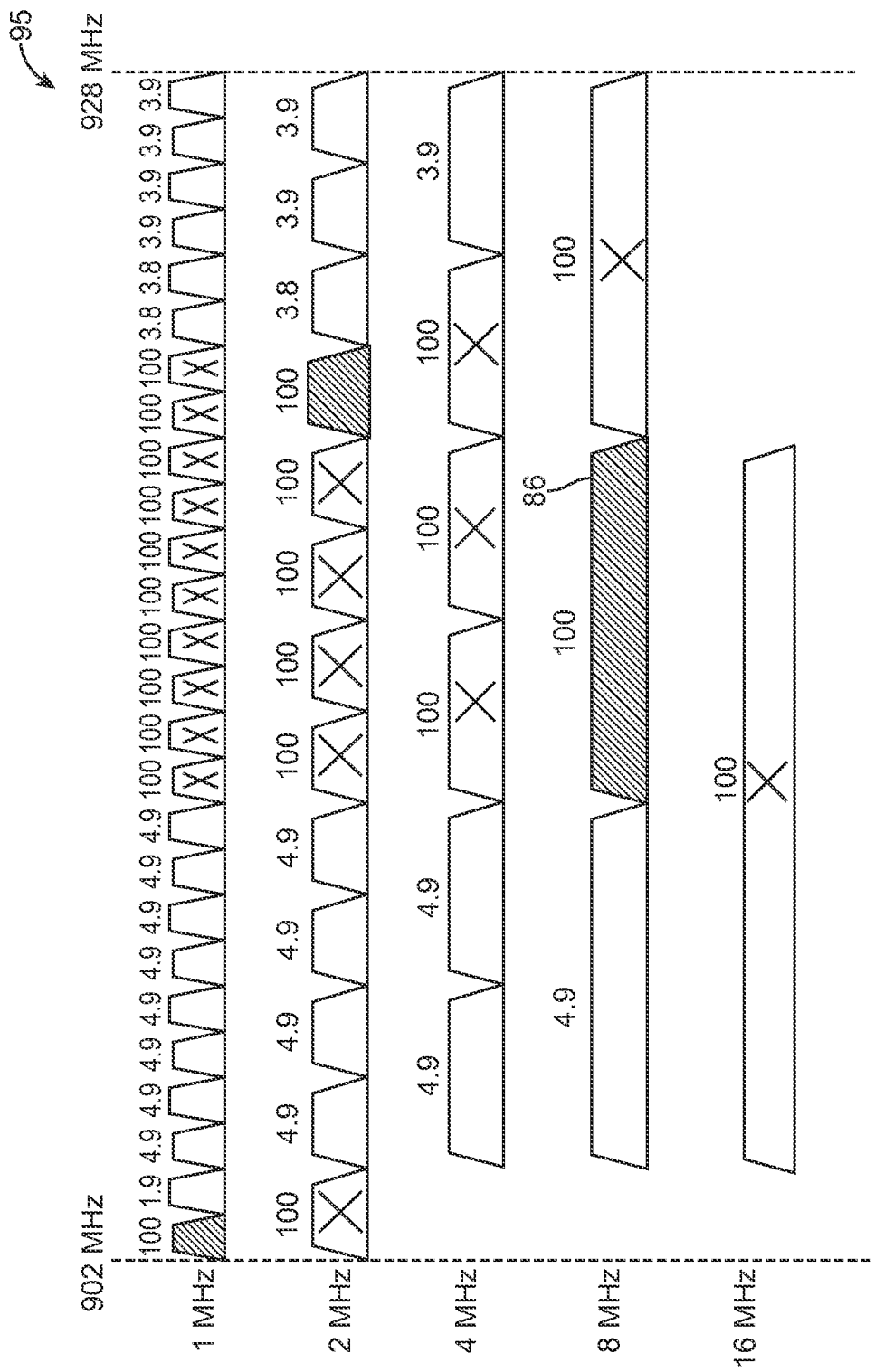
FIG. 10 shows a weight-based channelization and channel weight updating process based on FIG. 9 after a 8 MHz channel is selected, according to an embodiment of the present invention.

Referring to FIG. 9, similarly, when an additional 2 MHz channel 84 is in use, the weight values of the other channels in FIG. 8 are updated according to process 90 in FIG. 9. Referring to FIG. 10, similarly, when an additional 8 MHZ channel 86 is in use, the weight values of the other channels in FIG. 9 are updated according to process 95 in FIG. 10. After a used channel has been released, the weight values of related channels are updated again. This approach is applicable to other channelization schemes described herein as well.

According to an embodiment of the invention, in order to utilize the secondary 1 MHz channel concept shown in FIG. 4, an extra value (e.g., 3) is added to the base weight value of the secondary channels. With this approach, the secondary 1 MHz channels can only be selected (allocated) after none of the primary 1 MHz channels are available.

In order to set up a new network or peer-to-peer connection as noted conventionally, an AP or wireless station will scan all available channels one by one. This is a time-consuming process for scanning maximally twenty-six 1 MHz channels and thirteen 2 MHz channels. Using said weight-based approach, according to an embodiment of the invention, the channels are scanned based on their weights from low to high.

For example, if a current channel allocation status is as shown in FIG. 8, then when an AP desires to set up a new wireless network with a 2 MHz channel, the AP scans a 2 MHz channel 82 at 922-924 MHz first since the 2 MHz channel 82 has one of the lowest weights among all 2 MHz channels. If that 2 MHz channel is clean enough, the AP may directly select that channel to form new network. If that 2 MHz channel is not clean enough, the AP will continue to scan other 2 MHz channels with the order from low weight to high weight and proceed to select a channel for allocation. With this channel scanning approach, the channel selection time can be highly reduced.

Figure 11:
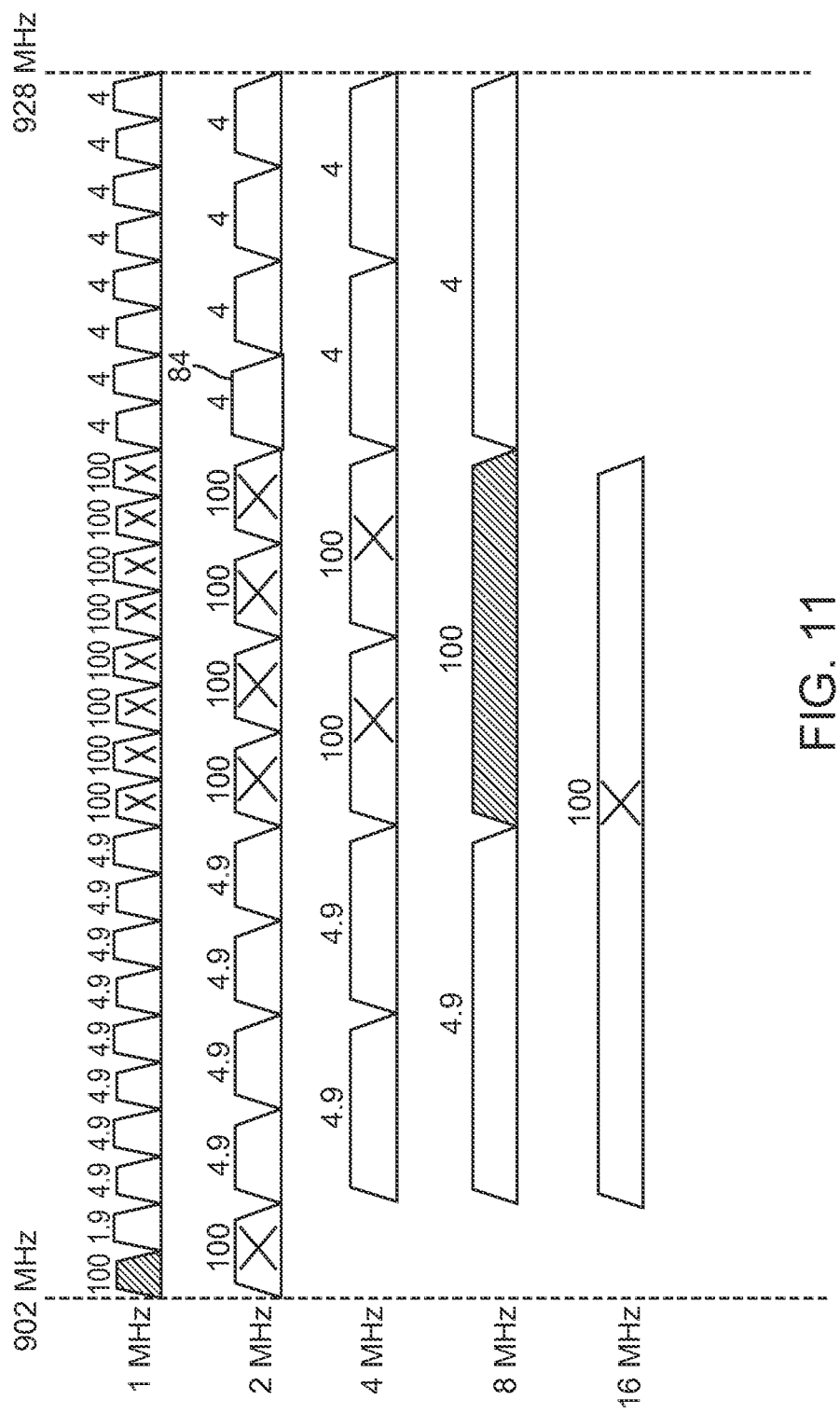
FIG. 11 shows a weight-based channelization and channel weight updating process based on FIG. 10 after a 2 MHz channel is released, according to an embodiment of the present invention.
Figure 12:
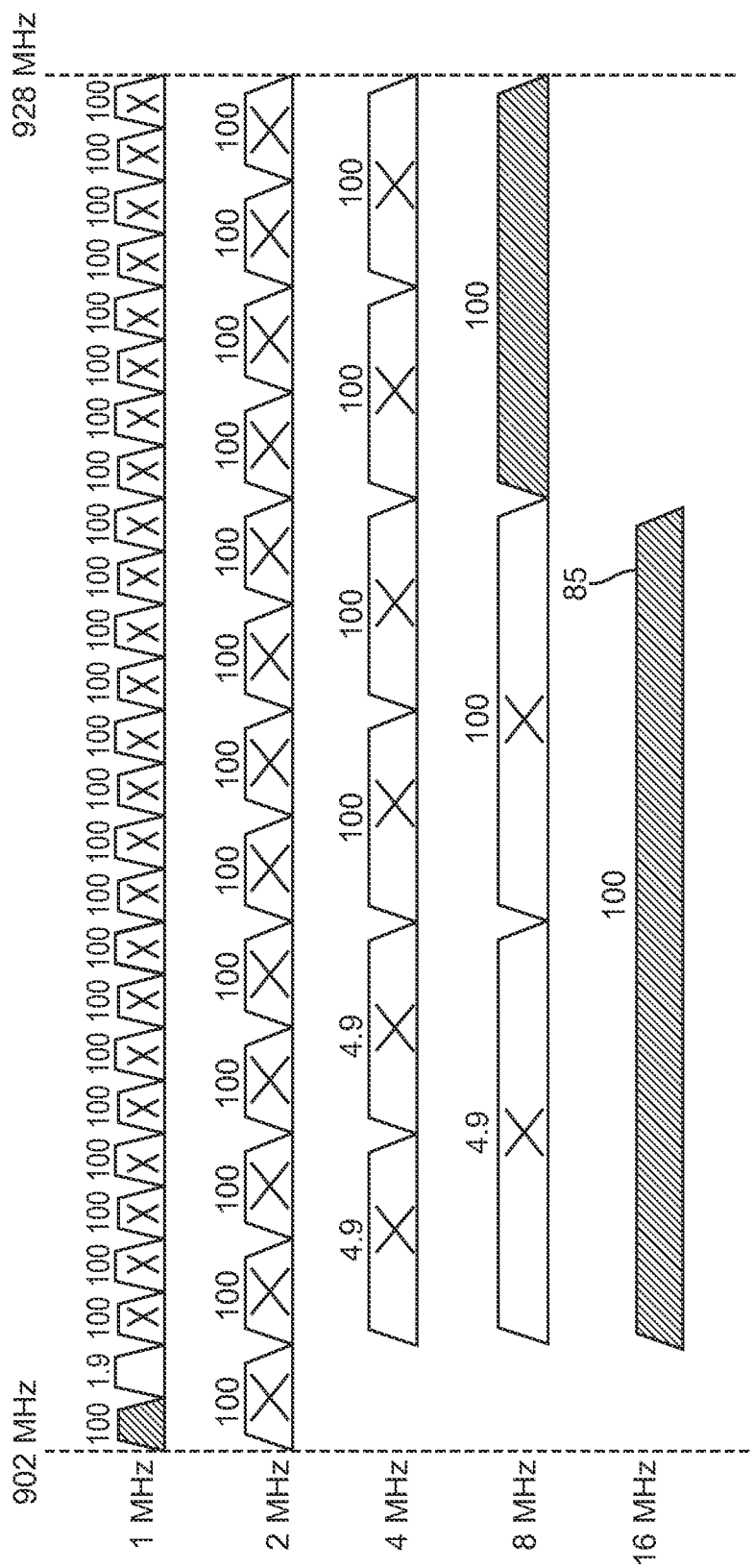
FIG. 12 shows a weight-based channelization and channel weight updating process based on FIG. 11 after a 4 MHz channel is released, according to an embodiment of the present invention.

An embodiment of the invention provides channel re-allocation (switching). In one embodiment, the invention provides re-allocating a currently selected (used) channel to a new band location if there are multiple locations wherein a channel can be re-allocated. For example, if a current channel allocation status is as shown in FIG. 10, an AP cannot set up a new wireless network with a 16 MHz channel scheme. However, after the 2 MHz channel 84 at 920-922 MHz is released as shown in FIG. 11, the occupied 8 MHz channel 86 at 912-920 MHz can be re-allocated (switched) to 920-928 MHz to allow new operation on a 16 MHz channel 85 as shown in FIG. 12. If there are multiple locations wherein a channel can be re-allocated, the channel location with lowest weight is first considered, wherein the lowest weight channel has the highest priority for allocation.

Figure 13:
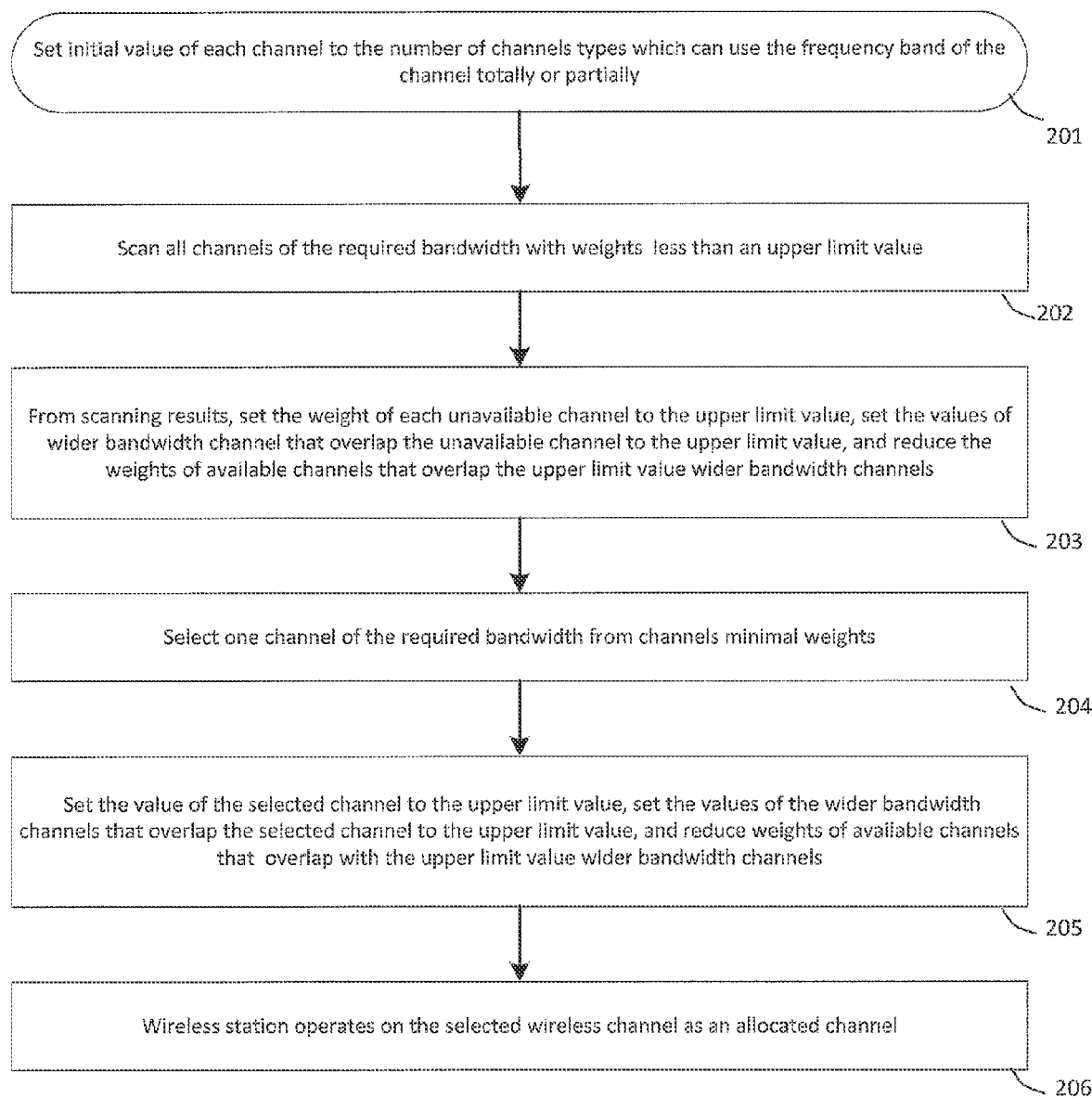
FIG. 13 is a flowchart of a channel allocation process for an access point (AP) or other wireless station, scanning channels of the required bandwidth before selecting (allocating) a channel, according to an embodiment of the invention.

FIG. 13 is a flowchart of a channel allocation process 200 for an AP or other wireless station, scanning channels of the required bandwidth before selecting (allocating) a channel, according to an embodiment of the invention. In process block 201, initially, an AP or wireless station (STA) sets the initial weight value of each channel to the number of channels types, which can use the channel's frequency band wholly or partially. In process block 202, when an AP or STA desired to select a new channel, a passive or active scan is performed on all channels of the required bandwidth whose weight values are less than an upper limit weight value. In one embodiment, the required bandwidth is determined based on application and also based on the channel bandwidth capability of an AP or wireless station. For example, if an AP can only support 1 MHz channels, then only a 1 MHz channel can be used. In another example, if an AP can support all channel types and an application requests as high a communication speed as possible, then the required bandwidth is 16 MHz. In one embodiment, said upper limit is the maximum possible number of weight values and is set as a large number, such as 100. Only unavailable (used or not clean) channels can be set at a 100 weight value. Idle (clean or available) channels cannot be set to the value of 100. The upper limit value must be larger than largest initial weight value which in one example is 5.

In process block 203, from scanning results, the weight values of unavailable channels are set to the upper limit weight value. The weight values of the wider bandwidth channels that overlap with the unavailable channels are set to the upper limit weight value. In addition, the weight values of those available channels that have overlap with the upper limit weight-valued wider bandwidth channels are reduced. The reduction weight value is determined by the number of the overlapped wider bandwidth channels multiplying a small value.

In process block 204, one channel of the required bandwidth is selected from those which have minimal channel weight values. In process block 205, the weight value of the selected channel is set to the upper limit weight value. The weight values of the wider bandwidth channels that overlap with the selected channel is set to the upper limit weight value. In addition, the weight values of those available channels that overlap the upper limit weight-valued wider bandwidth channels are reduced. The reduction value is decided by the number of the overlapped wider bandwidth channels multiplying a small value. In process block 206, the AP or STA operates (i.e., communicates) on the selected wireless channel as an allocated channel.

Figure 14:
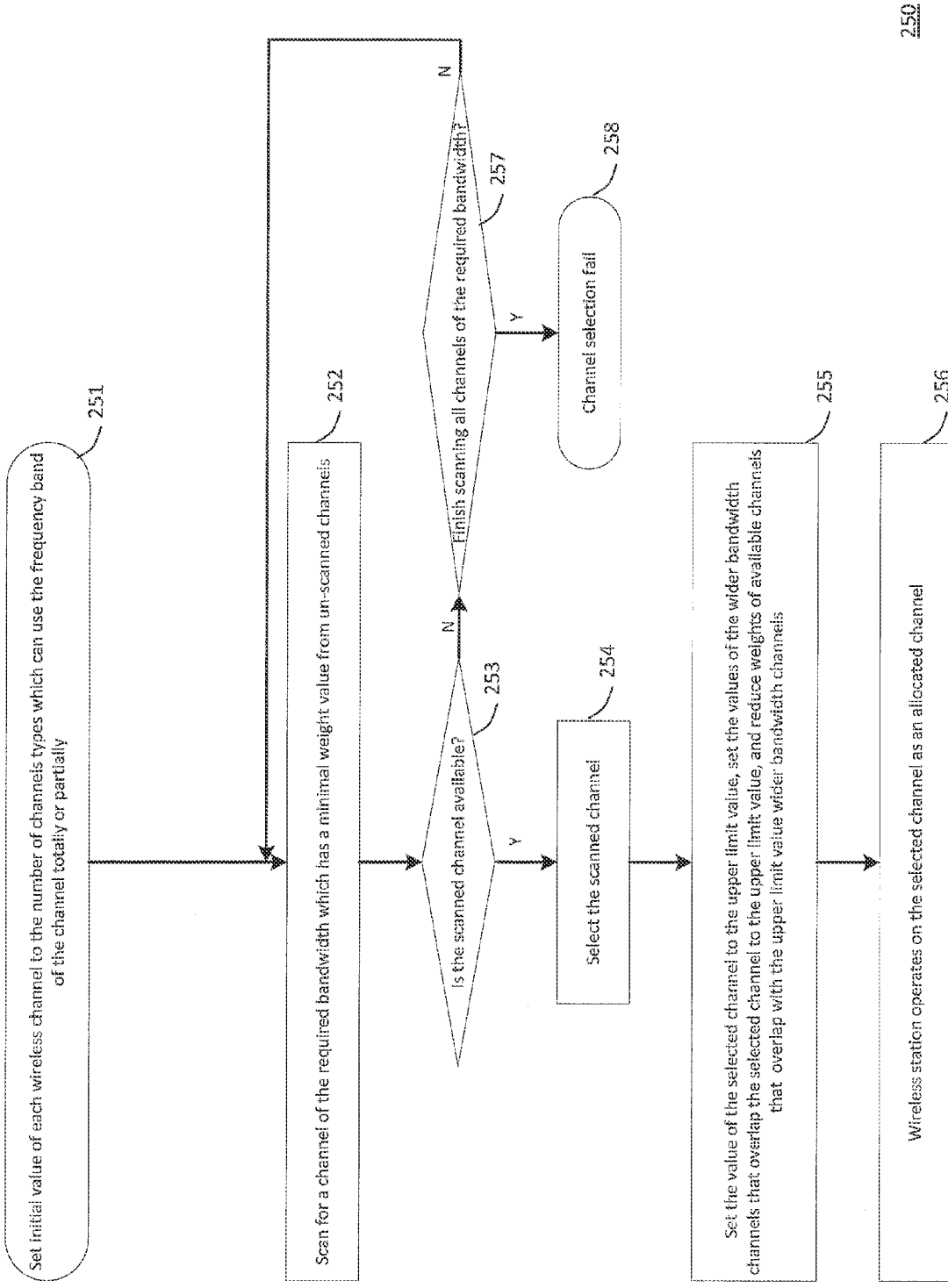
FIG. 14 is a flowchart of a channel allocation process for an AP or other wireless station, scanning channels of the required bandwidth while reducing channel scanning time, before selecting (allocating) a channel, according to an embodiment of the invention.

FIG. 14 is a flowchart of a channel allocation process 250 for an AP or other wireless station, scanning channels of the required bandwidth while reducing channel scanning time, before selecting (allocating) a channel, according to an embodiment of the invention.

In process block 251, initially, an AP or STA sets the initial weight value of each channel to the number of channel types, which can use a channel frequency band wholly or partially. When an AP or STA desires to select a new channel, in process block 252, a passive or active scan is performed for a channel of the required bandwidth which has the minimal weight value from un-scanned channels. In process block 253, it is determined if the scanned channel is available. If yes, then in process block 254 that channel is selected. And, in process block 255, the weight value of the selected channel is set to the upper limit weight value. The weight values of the wider bandwidth channels that overlap the selected channel are set to the upper limit weight value. In addition, the weight values of those available channels that overlap with the upper limit weight-valued wider bandwidth channels are reduced. The reduction value is decided by the number of the overlapped wider bandwidth channels multiplying a small value. In process block 256 the AP or STA operates (i.e., communicates) on the selected wireless channel as an allocated channel.

If in process block 253, the scanned channel is unavailable, then in process block 257 if scanning of the channels of the required bandwidth is to continue, the process proceeds to process block 252, otherwise the process proceeds to process block 258, wherein it is indicated that the channel selection fails.

Figure 15:
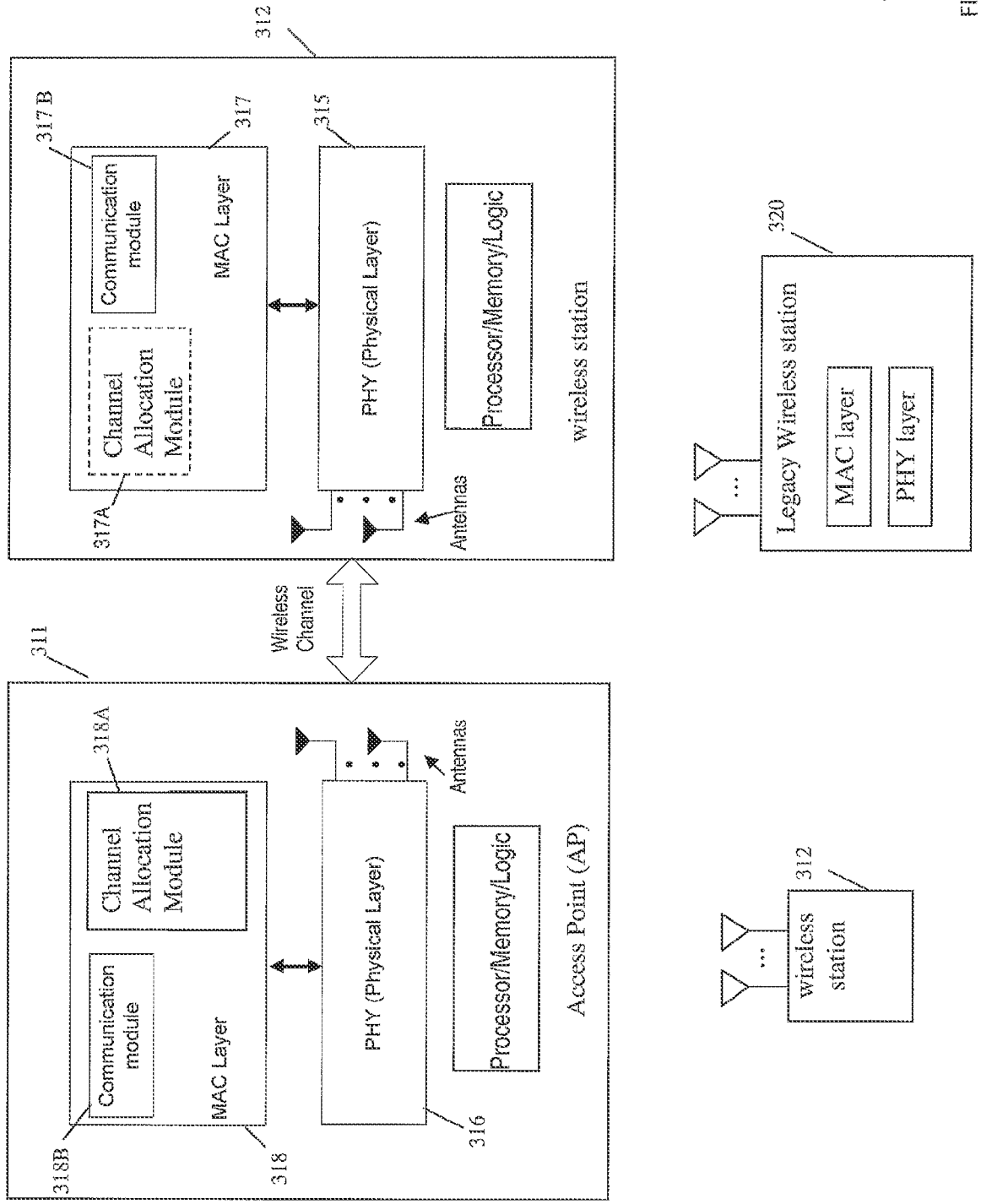
FIG. 15 shows a more detailed block diagram of a wireless communication system implementing channel allocation, according to an embodiment of the present invention.

FIG. 15 shows a block diagram of an architecture for an example wireless system/network such as WLAN 300 implementing channel allocation for access to a shared channel, according to an embodiment of the present invention. The network 300 comprises multiple wireless stations including an AP station 311, one or more other wireless stations 312 (e.g., as in the network in FIG. 1).

The AP 311 includes a PHY layer 316 and a MAC layer 318. The MAC layer 318 implements channel allocation module 318A and a communication module 318B. The station 312 includes a PHY layer 315 and a MAC layer 317. The MAC layer 317 implements a channel allocation module 317A and communication module 317B. Each PHY layer 315, 316, may comprise one or multiple antennas.

Each of the channel allocation modules 318A and 317A implements channel allocation as described herein, according to the embodiments of the invention. Further, each of the communication modules 317B and 318B performs MAC layer functions such as processing of data from upper layers for communication via the PHY layer. The communication module 318B further implements typical AP functions. The communication modules 318B, 317B enable the coordinator 311 and a station 312 to communicate over a shared wireless channel via the PHY layers (e.g., sending and receiving packets, etc.). Optionally, one or more legacy stations 320 may be exist in the network.

As is known to those skilled in the art, the aforementioned example architectures described above, according to the present invention, can be implemented in many ways, such as program instructions for execution by a processor, as software modules, as microcode, as computer program products on computer readable media, as logic circuits, as application specific integrated circuits, as firmware, as consumer electronic devices, etc.

The embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Figure 16:
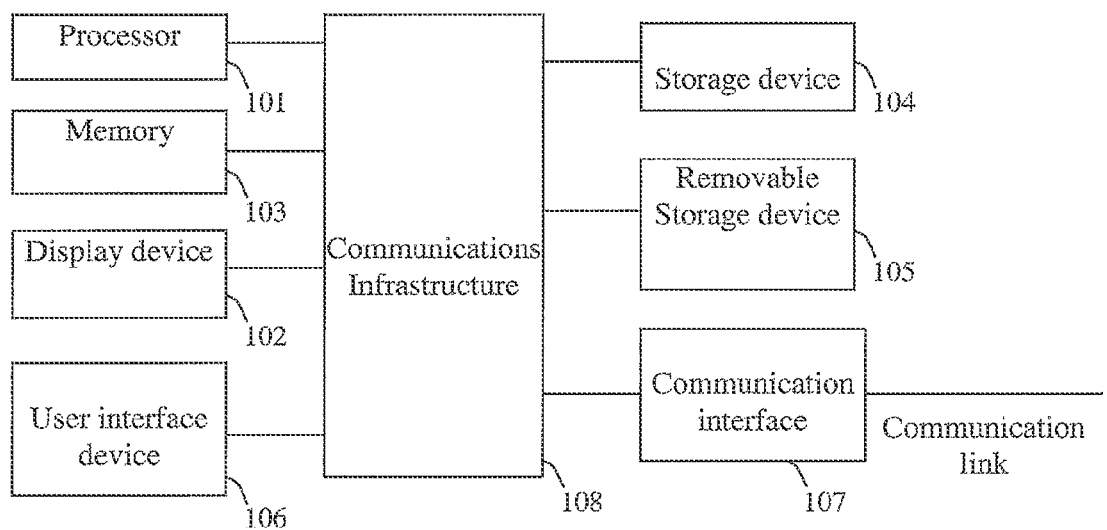
FIG. 16 is a high-level block diagram showing an information processing system comprising a computer system useful for implementing an embodiment of the present invention.

FIG. 16 is a high-level block diagram showing an information processing system comprising a computer system 100, useful for implementing an embodiment of the present invention. The computer system 100 includes one or more processors 101, and can further include an electronic display device 102 (for displaying graphics, text, and other data), a main memory 103 (e.g., random access memory (RAM)), a storage device 104 (e.g., hard disk drive), a removable storage device 105 (e.g., a removable storage drive, a removable memory module, a magnetic tape drive, an optical disk drive, a computer readable medium having stored therein computer software and/or data), a user interface device 106 (e.g., keyboard, touch screen, keypad, pointing device), and a communication interface 107 (e.g., a modem, a network interface [such as an Ethernet card], a communications port, or a PCMCIA slot and card). The communication interface 107 allows software and data to be transferred between the computer system and external devices. The system 100 further includes a communications infrastructure 108 (e.g., a communications bus, crossover bar, or network) to which the aforementioned devices/modules 101 through 107 are connected.

Information transferred via communications interface 107 may be in the form of signals such as electronic, electromagnetic, optical, or other signals capable of being received by communications interface 107, via a communication link that carries signals and may be implemented using wire or cable, fiber optics, a phone line, or wireless such as a cellular phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

Embodiments of the present invention have been described with reference to flowchart illustrations and/or block diagrams of methods, apparatus (systems) and computer program products according to embodiments of the invention. Each block of such illustrations/diagrams, or combinations thereof, can be implemented by computer program instructions, and as computer-implemented method, and program product stored on a non-transitory computer useable medium. The computer program instructions when provided to a processor produce a machine, such that the instructions, which execute via the processor, create means for implementing the functions/operations specified in the flowchart and/or block diagram. Each block in the flowchart/block diagrams may represent a hardware and/or software module or logic, implementing embodiments of the present invention. In alternative implementations, the functions noted in the blocks may occur out of the order noted in the figures, concurrently, etc.

The terms "computer program medium," "computer usable medium," "computer readable medium," and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Furthermore, the computer readable medium may comprise computer readable information in a transitory state medium such as a network link and/or a network interface, including a wired network or a wireless network, that allows a computer to read such computer readable information. Computer programs (i.e., computer control logic) are stored in main memory and/or secondary memory. Computer programs may also be received via a communications interface. Such computer programs, when executed, enable the computer system to perform the features of the present invention as discussed herein. In particular, the computer programs, when executed, enable the multi-core processor to perform the features of the computer system. Such computer programs represent controllers of the computer system.

Though the present invention has been described with reference to certain versions thereof; however, other versions are possible. Therefore, the spirit and scope of the appended claims should not be limited to the description of the preferred versions contained herein.

What is claimed is:

1. A method of wireless communication channel allocation, comprising:
    scanning wireless channels for available wireless channels, wherein each wireless channel has an associated bandwidth and an associated weight value based on one or more different channel bandwidths; and
    selecting a wireless channel among the available wireless channels for allocation in wireless communication;
    wherein selecting the wireless channel comprises selecting the wireless channel among the available wireless channels such that a maximum number of wireless channels with wider bandwidth than the selected wireless channel remain available after selection of the wireless channel.

2. The method of claim 1, wherein selecting the wireless channel comprises:
    selecting the wireless channel among the available wireless channels such that the selected wireless channel has least overlap with other wider bandwidth available wireless channels.

3. The method of claim 1, further comprising:
    associating a weight value to each wireless channel; and
    selecting the wireless channel based on the associated weight.

4. The method of claim 3, wherein:
    associating a weight value to each wireless channel comprises associating an initial weight value to each available wireless channel based on a number of the one or more different channel bandwidths as channel types;
    scanning the available wireless channels based on channel weights for available wireless channels to reduce channel selection duration; and
    selecting a wireless channel among the available wireless channels such that the selected wireless channel has least overlap with other wider bandwidth available wireless channels.

5. The method of claim 4, further comprising:
    scanning wireless channels for available wireless channels based on the weights associated with the wireless channels from low to high, to reduce channel selection duration.

6. The method of claim 4, further comprising:
    selecting a wireless channel with the lowest weight value from all available wireless channels based on scanning results;
    adjusting the weight of the selected wireless channel to an upper limit value; and
    adjusting the weight of an overlapping wireless channel of a different bandwidth as the selected wireless channel, to said upper limit value.

7. The method of claim 6, further comprising:
    reducing the weight of a wireless channel of the same bandwidth as the selected wireless channel and overlapping wider bandwidth wireless channels with weights adjusted to said upper limit value.

8. The method of claim 4, further comprising:
    selecting a wireless channel based on the weight associated with the wireless channel, such that a maximum number of wireless channels with wider bandwidth than the selected wireless channel remain available after selection of the wireless channel.

9. The method of claim 1, further comprising:
    categorizing a lower half of a wireless channel bandwidth as a primary channel, and upper half of the wireless channel bandwidth as a secondary channel, wherein the primary channel has a higher priority for selection; and
    selecting a secondary channel only when no primary channels are available.

10. The method of claim 1, further comprising:
    selecting a lower half or an upper half of a wireless channel bandwidth based on availability, wherein said lower half has the same priority for selection as said upper half.

11. The method of claim 7, further comprising:
re-allocating a currently selected wireless channel to a new available wireless channel bandwidth location having the lowest weight.

12. The method of claim 1, further comprising:
allocating the selected wireless channel for wireless transmission in a wireless local area network between 902 MHz and 928 MHz.

13. A wireless station, comprising:
a communication module configured for processing information for transmission on a wireless communication channel; and
a channel allocation module for allocating the wireless communication channel, wherein the channel allocation module is configured for scanning wireless channels for available wireless channels wherein each wireless channel has an associated bandwidth and an associated weight value based on one or more different channel bandwidths, and selecting the wireless channel among the available wireless channels for allocation in wireless communication;
wherein selecting the wireless channel comprises selecting the wireless channel among the available wireless channels such that a maximum number of wireless channels with wider bandwidth than the selected wireless channel remain available after selection of the wireless channel.

14. The wireless station of claim 13, wherein the channel allocation module selects the wireless channel among the available wireless channels such that the selected wireless channel has least overlap with other wider bandwidth available wireless channels.

15. The wireless station of claim 13, wherein each wireless channel has an associated weight value such that the channel allocation module selects wireless channels based on the associated weight.

16. The wireless station of claim 15, wherein:
each wireless channel has an associated initial weight value based on the number of different channel bandwidths as channel types; and
the channel allocation module scans the wireless channels based on channel weights for available wireless channels to reduce channel selection duration, and selects the wireless channel among the available wireless channels such that the selected wireless channel has least overlap with other wider bandwidth available wireless channels.

17. The wireless station of claim 16, wherein the channel allocation module scans wireless channels for available wireless channels based on the weights associated with the wireless channels from low to high, to reduce channel selection duration.

18. The wireless station of claim 16, wherein the channel allocation module selects a wireless channel with the lowest weight value from all available wireless channels based on scanning results, adjusts the weight of the selected wireless channel to an upper limit value and adjusts the weight of an overlapping wireless channel of a different bandwidth as the selected wireless channel, to said upper limit value.

19. The wireless station of claim 18, wherein the channel allocation module reduces the weight of a channel of the same bandwidth as the selected wireless channel and overlapping wider bandwidth wireless channels with weights adjusted to said upper limit value.

20. The wireless station of claim 16, wherein the channel allocation module selects a wireless channel based on the weight associated with the wireless channel, such that a maximum number of wireless channels with wider bandwidth than the selected wireless channel remain available after selection of the wireless channel.

21. The wireless station of claim 13, wherein a lower half of a channel bandwidth is categorized as a primary channel, and upper half of the channel bandwidth is categorized as a secondary channel, wherein the primary channel has as higher priority for selection, such that the channel allocation module selects a secondary channel only when no primary channels are available.

22. The wireless station of claim 13, wherein the channel allocation module selects a lower half or an upper have of a channel bandwidth based on availability, wherein said lower half has the same priority for selection as said upper half.

23. The wireless station of claim 19, wherein the channel allocation module re-allocates a currently selected wireless channel to a new available channel bandwidth location having the lowest weight.

24. The wireless station of claim 13, wherein the wireless station comprises an access point in a local area network.

25. A program product stored on a non-transitory computer useable medium for wireless communication channel allocation, the program product comprising program code for causing a computer system to perform the following steps:
scanning wireless channels via a physical (PHY) wireless communication layer for available wireless channels, wherein each wireless channel has an associated bandwidth and an associated weight value based on one or more different channel bandwidths; and
selecting a wireless channel among the available wireless channels for allocation in wireless communication;
wherein selecting the wireless channel comprises selecting a wireless channel among the available wireless channels such that a maximum number of wireless channels with wider bandwidth than the selected wireless channel remain available after the selection.

26. The program product of claim 25, wherein selecting the wireless channel comprises:
selecting a wireless channel among the available wireless channels such that the selected wireless channel has least overlap with other wider bandwidth available wireless channels; and
allocating the selected wireless channel for wireless transmission in a wireless location area network.

27. The program product of claim 26, further comprising:
associating an initial weight value to each available wireless channel based on the number of different channel bandwidths as channel types;
scanning the wireless channels based on channel weights for available wireless channels to reduce channel selection duration; and
selecting the wireless channel based on the associated weight such that the selected wireless channel has least overlap with other wider bandwidth available wireless channels.

28. The program product of claim 27, further comprising:
scanning wireless channels for available wireless channels based on the weights associated with the wireless channels from low to high, to reduce channel selection duration;
selecting a wireless channel with the lowest weight value from all available wireless channels based on scanning results;
adjusting the weight of the selected wireless channel to an upper limit value;

reducing the weight of an overlapping wireless channel of the same bandwidth as the selected wireless channel; and adjusting the weight of an overlapping wireless channel of a different bandwidth as the selected wireless channel, to said upper limit value.

29. The program product of claim 27, further comprising:

selecting the wireless channel based on the weight associated with the wireless channel, such that a maximum number of wireless channels with wider bandwidth than the selected wireless channel remain available after selection of the wireless channel.

30. The program product of claim 25, further comprising:

categorizing a lower half of a channel bandwidth as a primary channel, and upper half of the channel bandwidth as a secondary channel, wherein the primary channel has as higher priority for selection; and selecting a secondary channel only when no primary channels are available.

31. The program product of claim 25, further comprising:

selecting a lower half or an upper have of a channel bandwidth based on availability, wherein said lower half has the same priority for selection as said upper half.

32. The program product of claim 27, further comprising:

re-allocating a currently selected wireless channel to a new available wireless channel bandwidth location having the lowest weight.

\* \* \* \* \*